(12) United States Patent
Xiang et al.

(10) Patent No.: US 9,845,257 B2
(45) Date of Patent: Dec. 19, 2017

(54) VERTICAL SEWAGE TREATMENT DEVICE AND METHOD

(71) Applicant: Chinese Research Academy of Environmental Sciences, Beijing (CN)

(72) Inventors: Liancheng Xiang, Beijing (CN); Yonghui Song, Beijing (CN); Junqi Wu, Beijing (CN); Siyu Wang, Beijing (CN); Jianping Li, Beijing (CN); Xingfa Liu, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 0 days.

(21) Appl. No.: 15/102,500

(22) PCT Filed: Oct. 27, 2014

(86) PCT No.: PCT/CN2014/089603
§ 371 (c)(1),
(2) Date: Jun. 7, 2016

(87) PCT Pub. No.: WO2015/085835
PCT Pub. Date: Jun. 18, 2015

(65) Prior Publication Data
US 2016/0376178 A1    Dec. 29, 2016

(30) Foreign Application Priority Data

Dec. 10, 2013 (CN) .......................... 2013 1 0661950
Jan. 26, 2014 (CN) .......................... 2014 1 0040760

(51) Int. Cl.
C02F 3/30          (2006.01)

(52) U.S. Cl.
CPC .............. *C02F 3/301* (2013.01); *C02F 3/308* (2013.01); *C02F 3/302* (2013.01); *C02F 3/305* (2013.01); *C02F 2203/006* (2013.01)

(58) Field of Classification Search
CPC .......... C02F 3/301; C02F 3/302; C02F 3/305; C02F 3/308; C02F 2203/006
(Continued)

(56) References Cited

U.S. PATENT DOCUMENTS 6,086,765 A * 7/2000 Edwards ............... C02F 3/1247
                                                              210/194
6,183,643 B1 * 2/2001 Goodley ................. C02F 3/301
                                                              210/151

(Continued)

FOREIGN PATENT DOCUMENTS

CN      1607188 A     4/2005
CN    203530023 U     4/2014
JP     H0671290 A     3/1994

OTHER PUBLICATIONS

International Search Report (English translation), International application No. PCT/CN2014/089603, dated Feb. 11, 2015.

*Primary Examiner* — Fred Prince
(74) *Attorney, Agent, or Firm* — Marshall, Gerstein & Borun LLP

(57) ABSTRACT

The present invention provides a vertical sewage treatment device including an anaerobic chamber, an anoxic chamber, an aerobiotic chamber, and a secondary precipitation chamber, wherein the anaerobic chamber, the anoxic chamber, the aerobiotic chamber, and the secondary precipitation chamber are vertically arranged in sequence from the bottom to the top. According to another aspect, the present invention also provides a sewage treatment method using the foregoing vertical sewage treatment device. The sewage treatment device and method of the present invention have the advantages such as a reduced occupied area, improved oxygenation efficiency, a decreased head loss, a reduced invalid structure volume, and a low heat loss.

9 Claims, 2 Drawing Sheets

(58) Field of Classification Search
USPC ........ 210/605, 623, 630, 260, 261, 903, 906
See application file for complete search history.

(56) References Cited

U.S. PATENT DOCUMENTS

| | | | |
|---|---|---|---|
| 2004/0035770 A1* | 2/2004 | Edwards | C02F 3/006 210/137 |
| 2012/0006744 A1* | 1/2012 | Phattaranawik | C02F 3/301 210/605 |
| 2014/0263048 A1* | 9/2014 | Kasparian | C02F 3/006 210/630 |

* cited by examiner

VERTICAL SEWAGE TREATMENT DEVICE AND METHOD

This patent application is a National Stage of PCT/CN2014/089603 filed Oct. 27, 2014, which claims priority to Chinese Patent Application No. 201410040760.5 filed Jan. 26, 2014 and Chinese Patent Application No. 201310661950.4, entitled Vertical Sewage Treatment Device and Method, filed on Dec. 10, 2013, by Chinese Research Academy of Environmental Sciences, the disclosure of which is incorporated herein by reference in its entirety.

TECHNICAL FIELD OF THE INVENTION

The present invention relates to a sewage treatment device and method which are mainly applied to the field of sewage biological treatment such as urban centralized sewage treatment, industrial wastewater treatment and decentralized sewage treatment.

BACKGROUND OF THE INVENTION

Modern sewage treatment technologies include a physical treatment method, a chemical treatment method and a biological treatment method. The physical and chemical treatment methods generally act as pretreatment methods in sewage treatment. And the biological treatment method acts as a main treatment process. Currently, the biological treatment method employed more frequently in sewage treatment processes of various countries is also an activated sludge method.

The activated sludge method is a sewage biological treatment process method with activated sludge as a main body. The activated sludge method is that air is constantly introduced into wastewater, after a certain time period sludge-like flocculation is formed due to reproduction of an aerobic microorganism. The sludge-like flocculation is habited thereon with microbiota with zoogloea as a main component, having a strong capability of adsorbing and oxidizing organics. Biological coagulation, adsorption and oxidization of the activated sludge are used to decompose and eliminate organic pollutants in sewage, then the sludge is separated from water, most of the sludge flows back to an aeration tank, and a redundant portion may be drained out of an activated sludge system.

A sewage treatment plant employing a sewage treatment process of the activated sludge method generally adopts the following flow taking A2O process as a example: the sewage first passes through a grid, enters a grit chamber, a primary sedimentation tank, an anaerobic tank, an anoxic tank, an aerobic tank and a secondary sedimentation tank after lifted by a water pump, finally the treated water reaching an emission standard is drained out. In a sewage treatment plant, various treatment units are generally arranged horizontally. To enable the sewage to smoothly pass through the various treatment units from front to back, a free water surface of a later treatment unit shall be lower than that of a previous treatment unit, and a height difference of these two water surfaces shall be able to satisfy head loss of the sewage passing through a connection pipeline.

This conventional sewage treatment process with a horizontal layout has the following drawbacks: (1) a large occupation of ground, as all sewage treatment constructions are laid flat on the ground, so that the sewage treatment plant occupies a large area of the ground; (2) a large head loss: as pipelines are needed to connect between various sewage treatment constructions, resulting in a certain head loss between all of the various treatment constructions; (3) a low oxygenation efficiency: since the aeration tank has a limited depth, resulting in a lower water pressure, a low oxygenation efficiency, and a large power loss; (4) more invalid structure volumes of the constructions: to ensure no overflow of sewage out of the constructions, a certain superelevation portion is left at an upper end of each construction, resulting in more invalid structure volumes of the constructions; (5) a large heat loss in winter: since all sewage treatment constructions are laid flat on the ground, thereby forming a very large water surface, resulting in a large heat loss in cold climate conditions in winter.

SUMMARY OF THE INVENTION

In view of this, the present invention provides a vertical sewage treatment device and method that overcome the above described drawbacks of existing horizontal sewage treatment process.

At one aspect, the present invention provides a vertical sewage treatment device comprising an anaerobic compartment, an anoxic compartment, an aerobic compartment and a secondary sedimentation compartment, wherein the anaerobic compartment, the anoxic compartment, the aerobic compartment and the secondary sedimentation compartment are vertically arranged in sequence from bottom to top.

At another aspect, the present invention further provides a method of treating sewage using the above described vertical sewage treatment device comprising the following steps:

(1) performing a primary treatment on the sewage through a grit chamber and a primary sedimentation tank;

(2) enabling the sewage to enter from underneath the vertical sewage treatment device, under a pressure of a sewage pump, to the anaerobic compartment, the anoxic compartment, the aerobic compartment and the secondary sedimentation compartment in sequence, and finally draining out water from above.

wherein within the anaerobic compartment, the sewage is mixed with backflow sludge transported from the secondary sedimentation compartment, phosphorus accumulating bacteria in the sludge perform anaerobic phosphorus release utilizing dissolved organics in original sewage;

in the anoxic compartment, denitrifying bacteria in the sludge from the anaerobic compartment utilize a mixing of remaining organics and nitrate in the mixed liquid transported from the aerobic compartment and perform denitrification;

in the aerobic compartment, nitrifying bacteria in the sludge from the anoxic compartment perform nitrification under an oxygen-rich condition to transform ammonia nitrogen in the sewage into nitrate, meanwhile phosphorus accumulating bacteria perform aerobic phosphorus absorption, the remaining organics are also oxidized by aerobic bacteria here;

in the secondary sedimentation compartment, water is separated from sludge, the treated water is discharged via a water outlet, sedimented sludge returns to the anaerobic compartment, phosphorous is drained out in a form of remaining phosphorus-rich sludge.

The sewage treatment device and method according to the present invention have the following features:

(1) a reduced occupation of ground, an occupation area of main constructions of the sewage treatment process according to the present invention is determined by dividing an amount of sewage by a surface hydraulic load of the secondary sedimentation compartment, namely, an area of a secondary sedimentation tank; (2) an improved oxygenation efficiency, since there is a secondary sedimentation compartment above the aerobic compartment, water pressure in the aerobic compartment increases so that the oxygenation efficiency of the aerobic compartment is improved; (3) a reduced head loss, the head loss is reduced because various treatment compartments in the device are directly connected. (4) a reduced invalid structure volume, the anaerobic compartment is directly connected with the anoxic compartment and the anoxic compartment is directly connected with the aerobic compartment, thereby reducing the structure volume of a superelevation portion. (5) a low heat loss, since the various compartments are arranged along length, exposed water surface area is reduced, heat dissipation area is reduced and heat loses in winter is small.

DETAILED DESCRIPTION OF EMBODIMENTS

Figure 1:
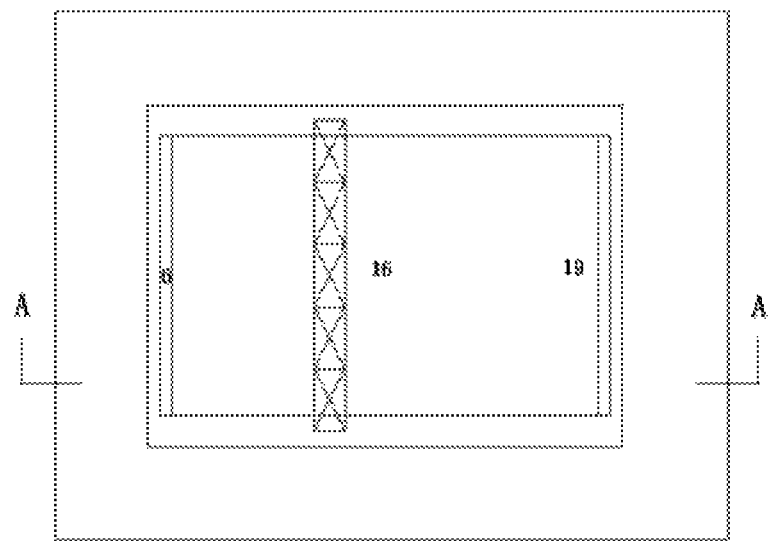
FIG. 1 is a top view of a vertical sewage treatment device according to the present invention.
Figure 2:
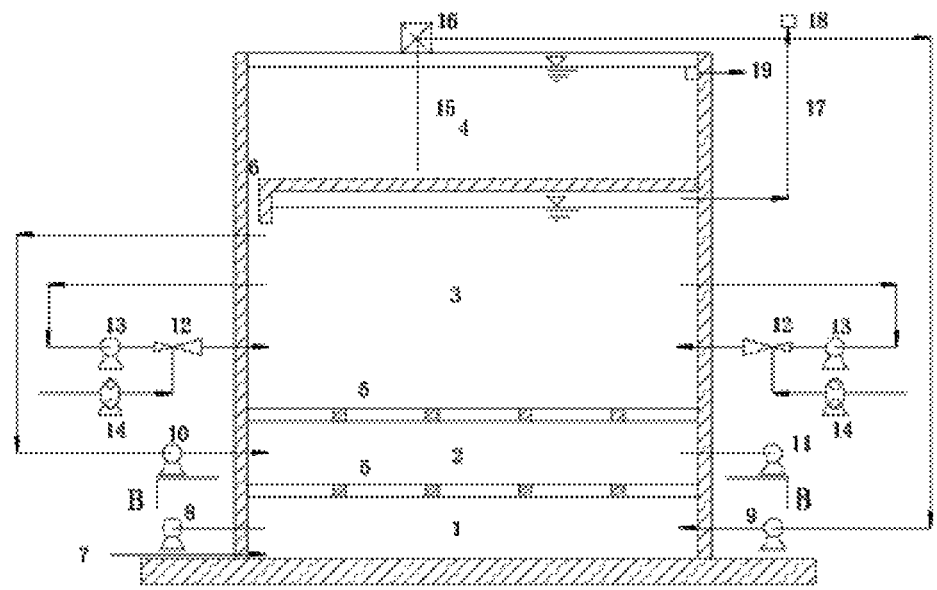
FIG. 2 is a sectional view taken along line A-A of FIG. 1.
Figure 3:
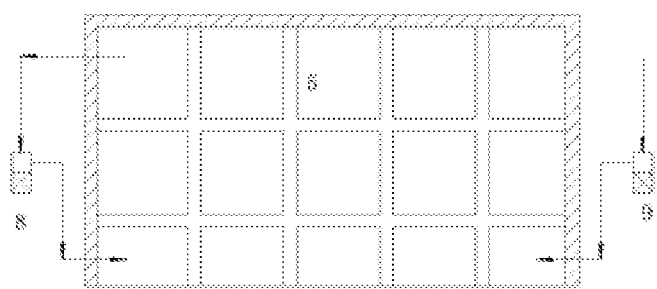
FIG. 3 is a sectional view taken along line B-B of FIG. 2.
wherein 1 is an anaerobic compartment of a vertical sewage treatment construction, 2 is an anoxic compartment, 3 is an aerobic compartment, 4 is a secondary sedimentation compartment, 5 is a horizontal mesh, 6 is a mixed liquid passageway from the aerobic compartment to the secondary sedimentation compartment, 7 is inflow water, 8 is a mixing pump for an anaerobic compartment and pipeline, 9 is a sludge backflow pump and pipeline, 10 is a backflow pump for a mixed liquid of the aerobic compartment to the anoxic compartment and pipeline, 11 is a mixing pump for the anoxic compartment and pipeline, 12 is a jet aerator, 13 is a booster pump, 14 is a blower, 15 is a mud-sucking pipe for the secondary sedimentation compartment, 16 is a mud-sucking machine for the secondary sedimentation compartment, 17 is a gas exhaust pipe for the aerobic compartment, 18 is a gas exhaust outlet gas-water separator, and 19 is outflow water.

A vertical sewage treatment device according to the present invention mainly comprises an anaerobic compartment 1, an anoxic compartment 2, an aerobic compartment 3 and a secondary sedimentation compartment 4 which are vertically arranged in sequence from bottom to top. A horizontal orifice plate or mesh 5 is employed to mesh divide between the anaerobic compartment 1 and anoxic compartment 2 and between the anoxic compartment 2 and the aerobic compartment 3 which are vertically arranged up and down. On the one hand, the horizontal orifice plate or mesh 5 enables the sewage to pass therethrough evenly from a lower compartment to an upper compartment and also has a certain barrier function so that large convection of mixed liquid is not generated between different compartments. On the other hand, the horizontal orifice plate or mesh 5 functions as a reinforced structure to the construction. A horizontal grid plate is employed to mesh divide between the aerobic compartment 3 and the secondary sedimentation compartment 4 which are arranged up and down. The horizontal grid plate is both a top plate of the aerobic compartment 3 and a bottom plate of the secondary sedimentation compartment 4. Furthermore, a passageway 6 for the mixed liquid of the aerobic compartment 3 to enter the secondary sedimentation compartment 4 is provided at a side of the horizontal grid plate. At a side of the passageway 6, the horizontal grid plate connects a downwardly vertical grid plate, a height of which is greater than that of a gas-liquid separation area in the aerobic compartment (see the left side of FIG. 2). The passageway 6 only permits the mixed liquid of the aerobic compartment 3 to enter the secondary sedimentation compartment 4 and does not permit a gas to pass through.

In the present invention, a mixing pump 8, a sludge backflow pump 9 and pipelines are arranged at both sides out of the anaerobic compartment 1. The mixing pump 8 mixes the newly-entering sewage in the anaerobic compartment 1 with backflow sludge. The sludge backflow pump 9 transports sedimented sludge in the secondary sedimentation compartment 4 to the anaerobic compartment 1, the amount of the transported sedimented sludge (i.e. the amount of backflow) is generally 40-100% of the amount of inflow water.

In the present invention, a mixing pump 11, a backflow pump 10 for the mixed liquid of the aerobic compartment to the anoxic compartment and pipelines are arranged at both sides out of the anoxic compartment 2. The mixing pump 11 mixes the mixed liquid in the anoxic compartment 2. The mixed liquid backflow pump 10 transports the mixed liquid of the aerobic compartment 3 to the anoxic compartment 2, the amount of the transported mixed liquid (i.e. the amount of backflow) is generally 100-400% of the amount of inflow water.

In the present invention, a jet aerator 12, a booster pump 13 and a blower 14 are arranged at both sides out of the aerobic compartment 3 so as to provide oxygen for a biological reaction in the aerobic compartment. A gas exhaust pipe 17 is arranged on the top of the aerobic compartment 3 to exhaust waste gas in the gas-water separation area on the top of the aerobic compartment 3. To improve aeration pressure and thereby improve aeration oxygenation efficiency in the aerobic compartment 3, a gas exhaust outlet of the gas exhaust pipe 17 of the aerobic compartment 3 is disposed above a water surface of the secondary sedimentation compartment 4, a gas-water separator 18 such as a gravity-type gas-water separator, is disposed at the gas exhaust outlet to ensure that there is a certain pressure within the gas-water separation area of the aerobic compartment 3 such that the mixed liquid within the aerobic compartment 3 does not flow out of the gas exhaust pipe 17. A pressure of gas within the gas-water separator 18 is equal to a sum of an atmospheric pressure and a water level pressure difference between the water surface of the secondary sedimentation compartment 4 and the water surface of the aerobic compartment 3. A water-spraying apparatus is provided within the gas exhaust pipe 17 so as to eliminate foams and scum generated on a surface of the aerobic compartment 3.

In the present invention, a mud-sucking pipe 15 is arranged within the secondary sedimentation compartment 4, a mud-sucking machine 16 is disposed on the top of the mud-sucking pipe 15. Sedimented sludge on the bottom of the secondary sedimentation compartment 4 is sucked out by the mud-sucking machine 16 via the mud-sucking pipe 15, a part of the sucked sedimented sludge flows back to the anaerobic compartment 1 to re-participate in a biological degradation reaction, the other part of the sucked sedimented sludge is drained out in a form of remaining sludge.

A material for processing the device of the present invention may employ a steel plate, a reinforced concrete and the like. Mechanical equipment is not placed within the construction to avoid inconvenience caused by equipment maintenance.

A planar dimension of the device of the present invention is determined by dividing an amount of sewage by a surface hydraulic load of the secondary sedimentation compartment, namely, an area of a secondary sedimentation tank, a longitudinal height is determined by dividing a product of a sewage flow and a stay time in various biological treatment compartments by a planar area. When a large amount of sewage needs to be treated, multiple sets of individual devices may operate in parallel. When the multiple sets of individual devices operate in parallel, it needs to employ an underwater equipment corridor, within which external devices such as a mixing pump, a jet aerator, a booster pump and a blower and the like outside the various compartments are arranged to facilitate technician's management and maintenance.

The scale of the sewage treatment device may range from 100 tons per day to 1,000,000 tons per day.

The sewage treatment procedure using the vertical sewage treatment device according to the present invention is as follows: taking A2O process as an example for illustration, sewage first goes through a grit chamber and a primary sedimentation tank. If suspended matters in the sewage do not have a high concentration, the primary sedimentation tank may be omitted as usual, to retain sufficient organic carbon source in the sewage to meet a need for carbon source during denitrification. It may be considered that the sewage, after passing through the grit chamber, is pressurized by a water pump to enter into the vertical sewage treatment device.

Then, the sewage enters the anaerobic compartment 1, within which original sewage 7 is mixed with the backflow sludge transported from the sludge backflow pump 9 by the mixing pump 8, phosphorus accumulating bacteria in the sludge perform anaerobic phosphorus release utilizing dissolved organics in the original sewage.

The mixed liquid in the anaerobic compartment 1 then enters the anoxic compartment 2 via the horizontal orifice plate or mesh 5. In the anoxic compartment 2, denitrifying bacteria in such sludge perform denitrification utilizing remaining organics and nitrate in the mixed liquid of the aerobic compartment 3 transported by the backflow pump 10 under the mixing of the mixing pump 11.

Upon the completion of denitrification, the mixed liquid in the anoxic compartment 2 enters the aerobic compartment 3 via the horizontal orifice plate or mesh 5. The jet aerator 12, the booster pump 13 and the blower 14 arranged on both sides of the aerobic compartment provide oxygen for a biological reaction in the aerobic compartment 3. Nitrifying bacteria in such sludge perform nitrification under an oxygen-rich condition to transform ammonia nitrogen in the sewage into nitrate, meanwhile phosphorus accumulating bacteria perform aerobic phosphorus absorption, the remaining organics are also oxidized by aerobic bacteria here. The gas exhaust pipe 17 arranged on the top of the aerobic compartment 3 exhausts the waste gas in the gas-water separation area on the top of the aerobic compartment 3.

The mixed liquid in the aerobic compartment 3 enters the secondary sedimentation compartment 4 via the passageway 6. A mud-water separation is performed on the entered mixed liquid in the secondary sedimentation compartment 4. The treated water is drained out via a water outlet 19, sedimented sludge returns to the anaerobic compartment 1 through the mud-sucking pipe 15, the mud-sucking machine 16 and the sludge backflow pump 9, phosphorous is drained out in a form of remaining phosphorus-rich sludge.

The invention claimed is:

1. A vertical sewage treatment device, comprising an anaerobic compartment, an anoxic compartment, an aerobic compartment and a secondary sedimentation compartment, wherein the anaerobic compartment, the anoxic compartment, the aerobic compartment and the secondary sedimentation compartment are vertically arranged in sequence from bottom to top,
    wherein a horizontal orifice plate or mesh is employed to mesh divide between the anaerobic compartment and the anoxic compartment and between the anoxic compartment and the aerobic compartment,
    wherein a horizontal grid plate is employed to mesh divide between the aerobic compartment and the secondary sedimentation compartment, and a side of the horizontal grid plate is retained with a passageway for the mixed liquid within the aerobic compartment to enter the secondary sedimentation compartment, and at a side of the passageway, the horizontal grid plate connects a downwardly vertical grid plate, a height of which is greater than that of a gas-water separation area in the aerobic compartment.

2. The vertical sewage treatment device according to claim 1, wherein both sides out of the anaerobic compartment are arranged with a first mixing pump, a sludge backflow pump and pipelines; the sludge backflow pump transporting sedimented sludge in the secondary sedimentation compartment to the anaerobic compartment, the mixing pump mixing newly-entering sewage in the anaerobic compartment with backflow sludge.

3. The vertical sewage treatment device according to claim 2, wherein both sides out of the anoxic compartment are arranged with a second mixing pump, a mixed liquid backflow pump and pipelines, the mixed liquid backflow pump transporting mixed liquid of the aerobic compartment to the anoxic compartment, the second mixing pump mixing the mixed liquid in the anoxic compartment.

4. The vertical sewage treatment device according to claim 3, wherein a jet aerator, a booster pump and a blower are arranged at both sides out of the aerobic compartment so as to provide oxygen for a biological reaction within the aerobic compartment.

5. The vertical sewage treatment device according to claim 4, wherein a gas aerated in the aerobic compartment rises to a gas-water separation area on the top thereof, is exhausted via a gas exhaust pipe.

6. The vertical sewage treatment device according to claim 5, wherein a gas-water separator is disposed at an outlet of the gas exhaust pipe; a water-spraying apparatus is disposed within the gas exhaust pipe, for eliminating foams and scum generated on a surface of the aerobic compartment.

7. The vertical sewage treatment device according to claim 1, wherein a mud-sucking pipe is arranged within the secondary sedimentation compartment, a mud-sucking machine is disposed on the top of the mud-sucking pipe, sedimented sludge on a bottom of the secondary sedimentation compartment is sucked out by the mud-sucking machine via the mud-sucking pipe, a part of the sucked sedimented sludge flows by the sludge backflow pump back to the anaerobic compartment as the backflow sludge to re-participate in a biological degradation reaction, the other part of the sucked sedimented sludge is drained out in a form of remaining sludge.

8. The vertical sewage treatment device according to claim 1, wherein when multiple sets of vertical sewage treatment devices operate in parallel, an underwater equipment corridor is employed, and the first mixing pump, the second mixing pump, the jet aerator, the booster pump and blower of various devices are arranged in the underwater equipment corridor.

9. A method of treating sewage using a vertical sewage treatment device according to claim 1, comprising steps:
(1) performing a primary treatment on the sewage through a grit chamber and a primary sedimentation tank;
(2) enabling the sewage to enter from underneath the vertical sewage treatment device, under a pressure of a sewage pump, to the anaerobic compartment, the anoxic compartment, the aerobic compartment and the secondary sedimentation compartment in sequence, and finally draining out water from above;
wherein within the anaerobic compartment, the sewage is mixed with backflow sludge transported from the secondary sedimentation compartment, phosphorus accumulating bacteria in the sludge perform anaerobic phosphorus release utilizing dissolved organics in original sewage;
in the anoxic compartment, denitrifying bacteria in the sludge from the anaerobic compartment utilize a mixing of remaining organics and nitrate in the mixed liquid transported from the aerobic compartment and perform denitrification;
in the aerobic compartment, nitrifying bacteria in the sludge from the anoxic compartment perform nitrification under an oxygen-rich condition to transform ammonia nitrogen in the sewage into nitrate, meanwhile phosphorus accumulating bacteria perform aerobic phosphorus absorption, the remaining organics are also oxidized by aerobic bacteria here;
in the secondary sedimentation compartment, water is separated from sludge, the treated water is discharged via a water outlet, sedimented sludge returns to the anaerobic compartment, phosphorous is drained out in a form of remaining phosphorus-rich sludge.

* * * * *